(12) United States Patent
Jachner

(10) Patent No.: US 9,363,382 B2
(45) Date of Patent: Jun. 7, 2016

(54) CONFERENCE PRESENCE BASED MUSIC-ON-HOLD SUPPRESSION SYSTEM AND METHOD

(71) Applicant: Alcatel Lucent, Murray Hill, NJ (US)

(72) Inventor: Jack Jachner, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 143 days.

(21) Appl. No.: 14/035,741

(22) Filed: Sep. 24, 2013

(65) Prior Publication Data

US 2014/0023184 A1    Jan. 23, 2014

Related U.S. Application Data

(62) Division of application No. 11/268,362, filed on Nov. 7, 2005, now abandoned.

(51) Int. Cl.
*H04M 3/42* (2006.01)
*H04M 3/56* (2006.01)
*H04M 3/428* (2006.01)

(52) U.S. Cl.
CPC ............ *H04M 3/56* (2013.01); *H04M 3/428* (2013.01); *H04M 3/42059* (2013.01); *H04M 3/42221* (2013.01); *H04M 3/42365* (2013.01); *H04M 2203/5027* (2013.01)

(58) Field of Classification Search
CPC .............. H04M 2203/5063; H04M 3/567; H04M 7/006; H04M 7/0009; H04M 2250/62; H04M 3/4234; H04M 7/0027

USPC .............. 379/202.01–206.01; 709/204; 370/260–262
See application file for complete search history.

(56) References Cited

U.S. PATENT DOCUMENTS

| | | | |
|---|---|---|---|
| 6,353,662 B1 | 3/2002 | Foladare et al. | 379/101.01 |
| 6,556,670 B1 | 4/2003 | Horn | |
| 6,714,634 B1 * | 3/2004 | Breeden | 379/202.01 |
| 6,978,001 B1 * | 12/2005 | Shaffer et al. | 379/202.01 |
| 2005/0071426 A1 * | 3/2005 | Shah | 709/204 |

(Continued)

FOREIGN PATENT DOCUMENTS

| | | | |
|---|---|---|---|
| EP | 1 156 647 | 11/2001 | H04M 3/428 |
| EP | 1156647 A1 | 11/2001 | |

(Continued)

OTHER PUBLICATIONS

Technology White Paper "Rich Presence: A New User Communications Experience" 8 pages, copyrighted 1st quarter 2005.
J. Rosenberg "A Data model for Presence", draft-ietf-simple-data-model-05, Sep. 22, 2005, pp. 1-35.

(Continued)

*Primary Examiner* — Oleg Asanbayev
(74) *Attorney, Agent, or Firm* — Capitol Patent & Trademark Law Firm, PLLC

(57) ABSTRACT

A private branch exchange (PBX) (or network hosted device) is described herein that is capable of obtaining information (e.g., in-a-conference presence state) that indicates a user is participating in a multi-party conference call which is being hosted by an external conference/collaboration bridge and is further capable of disabling a music-on-hold feature on an extension associated with a device belonging to the user such that if the user places the device on-hold then no sound (e.g., music, radio) will be injected into the multi-party conference call.

4 Claims, 2 Drawing Sheets

(56) References Cited

U.S. PATENT DOCUMENTS

2005/0113134 A1* 5/2005 Bushnell et al. ............. 455/555
2006/0245558 A1* 11/2006 Gatzke et al. ............. 379/88.16

FOREIGN PATENT DOCUMENTS

WO     2005/083998     9/2005     ............. H04M 3/56
WO     2005083998 A1     9/2005

OTHER PUBLICATIONS

J. Rosenberg "A Presence Event Package for the Session Initiation Protocol (SIP)", RFC 3856, Aug. 2004, pp. 1-28.
H. Shulzerine et al RPID: Rich Presence Extensions to the Presence Information Data Format (PIDF), draft-ietf-simple-rpid-08, Jul. 16, 2005, pp. 1-41.
J. Rosenberg "Presence Authorization Rules", draft-ietf-simple-presence-rules-03, Jul. 20, 2005, pp. 1-27.

* cited by examiner

CONFERENCE PRESENCE BASED MUSIC-ON-HOLD SUPPRESSION SYSTEM AND METHOD

RELATED PATENT APPLICATION

This patent application is a divisional application of U.S. patent application Ser. No. 11/268,362 entitled "Conference Presence Based Music On Hold Suppression System And Method" filed on Nov. 7, 2005 the disclosure of which is hereby incorporated by reference in its entirety herein as if set forth in full herein.

BACKGROUND OF THE INVENTION

1. Field of the Invention

The present invention is related to a private branch exchange (PBX) (or network hosted device) which can automatically disable a music-on-hold feature for one of it's extensions that is attached to a device (e.g., phone) which belongs to a user when that user happens to be participating in a multi-party conference call being hosted by an external conference/collaboration bridge. This is desirable because if the user places their device on-hold then no music or other sound will be injected into the multi-party conference call.

2. Description of Related Art

A PBX typically has a music-on-hold feature such that if a user places their phone on-hold then the other party hears music/radio/company information etc. . . . This is fine in most situations. But, if the user is participating in a multi-party conference call that happens to be hosted by an external conference/collaboration bridge then this music-on-hold feature can be problematic. In particular, if the user places their phone on hold to take another phone call or to simply take a break from the multi-party conference call then music (or some other sound) is going to be played on the conference bridge to the annoyance of the other participants.

Today, this problem can be addressed if the conference/collaboration bridge has a voice activity detection (VAD) system or a signal energy detection system which can detect the conference legs that are contributing to the call. This enables one to determine which conference leg happens to be playing the music-on-hold when a participant is no longer participating in the multi-party conference call. And, if the conference/collaboration bridge has a graphical user interface (GUI) that can be used by a conference host to mute the offending music that is flooding the conference bridge because that particular participant has placed their phone on-hold. However, this solution has several drawbacks which include: (1) the multi-party conference call is disrupted until the extension being used by the offending person is muted; (2) the conference host needs to have access to the GUI; and (3) the conference host needs to focus their attention on solving this problem which can be very disruptive especially if they are also speaking or presenting at the same time. Accordingly, there has been and is a need to solve this problem which is done by the present invention.

BRIEF DESCRIPTION OF THE INVENTION

The present invention includes a PBX (or network hosted device) which is capable of obtaining information (e.g., in-a-conference presence state) that a user is likely participating in a multi-party conference call which is being hosted by an external conference/collaboration bridge and is further capable of disabling a music-on-hold feature on an extension connected to a device belonging to the user such that if the user places the device on-hold then no music or other sound will be injected into the multi-party conference call. Several different ways in which the PBX (or network hosted device) can obtain this information so it can disable the music-on-hold feature are described herein.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
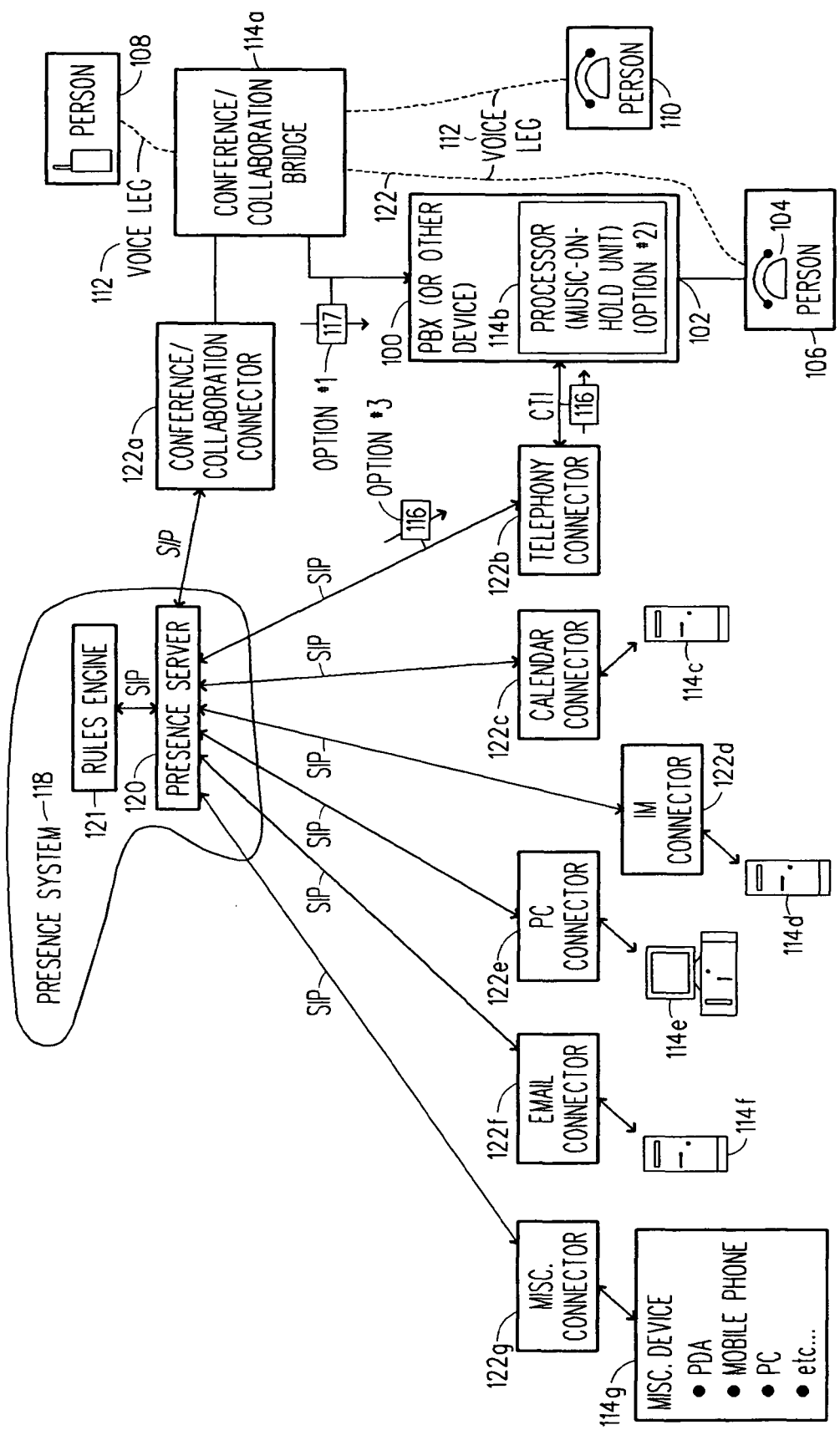
FIG. 1 is a block diagram that is used to help explain several different ways a PBX (or network hosted device) can obtain information so it knows when to disable a music-on-hold feature for a particular user in accordance with the present invention.

Referring to FIG. 1, there is illustrated a diagram which is used to help describe several different ways a PBX 100 (or network hosted device) can obtain information so it knows when to disable a music-on-hold feature for one of its users 106 when they happen to be participating in a multi-party conference call being hosted by an external conference/collaboration bridge 114a. Although the PBX 100 is used herein to describe the present invention, it should be appreciated that a network hosted device that has a music-on-hold feature like, for example, Centrex, IP-Centrex, a fixed line voice switch or a mobile voice switch . . . can implement the present invention.

The PBX 100 needs to obtain information that person 106 is participating with several other people 108 and 110 (only two shown) in a multi-party conference call (shown as voice legs 112) being hosted by the external conference/collaboration bridge 114a before it can disable the music-on-hold for an extension 102 connected to the person's device 104 (e.g., office phone 104). This capability is important because if person 106 places their device 104 on-hold then no sound will be injected into the multi-party conference call. There are several ways the PBX 100 can obtain this information which indicates that person 106 is participating in a multi-party conference call being hosted by an external conference/collaboration bridge 114a.

In one way, the PBX 100 obtains this information directly from the conference/collaboration bridge 114a (shown as option #1). In this case, the PBX 100 receives information 117 directly from the conference/collaboration bridge 114a that indicates person 106 is participating in a multi-party conference call. The conference/collaboration bridge 114a determines this information 117 by analyzing a phone number of a called/calling party that may be participating in a multi-party conference call and by mapping that phone number to the device 104 used by person 106. Upon receiving this information 117, the PBX 100 (in particular the processor/music-on-hold suppression unit 114b) disables the music-on-hold feature for that person's device 104.

In another way, the PBX 100 determines by itself that person 106 is likely to be participating in a multi-party conference call which is being hosted by the external conference/collaboration bridge 114a (shown as option #2). In this case, the PBX 100 infers that person 106 is participating in a multi-party conference call by analyzing either a phone number called by person 106 or a phone number calling the person 106 and determining that the phone number is associated with the conference/collaboration bridge 114a. The PBX 100 (in particular the processor/music-on-hold suppression unit 114b) then disables the music-on-hold feature for that person's device 104.

In yet another way, the PBX 100 obtains this information in the form of an in-a-conference presence state 116 from a presence system 118 (shown as option #3). In this case, the presence system 118 collects real-time information about the activities of person 106 and if the collected information indicates that person 106 is likely participating in a multi-party conference being hosted by an external conference/collaboration bridge 114a then it sets and publishes the in-a-conference presence state 116. To enable this way, the PBX 100 subscribes with the presence system 118 to be a watcher of person 106 so it can obtain published presence information about person 106 which includes the in-a-conference presence state 116. There are many different ways the presence system 118 can collect this real-time information about person 106 and then determine/infer that person 106 is participating in a multi=party conference call which is being hosted by the external conference/collaboration bridge 114a. Some of these different ways are described after a brief discussion is provided about the basic structure/function of the presence system 118.

As shown, the presence system 118 includes a presence server 120 which is connected to a rules engine 121. Alternatively, the presence server 120 could be co-located with the rules engine 121. In either case, the presence server 120 is coupled via multiple Session Initiation Protocol (SIP) interfaces (for example) to various connectors 122a, 122b ... 122g which in turn are coupled to various devices 114a, 114b ... 114g. In this example, the connectors 122 include a conference/collaboration connector 122a, a telephony connector 122b, a calendar connector 122c, an IM connector 122d, a PC connector 122e, an email connector 122f and a miscellaneous connector 122g. And, the devices 114 include the conference/collaboration bridge 114a, a processor/music-on-hold suppression unit 114b (shown located in PBX 100), a calendar server 114c, an IM server 114d, a PC 114e, an email server 114f and miscellaneous devices 114g (e.g., personal digital assistant (PDA), mobile phone, PC). For clarity, the description provided herein about the presence system 118, the various connectors 122a, 122b ... 122g and the various devices 114a, 114b ... 114g omits those details that are well known in the industry and are not needed to understand the present invention.

The presence server 120 collects a wide-variety of information about the real-time activities of person 106 and then the rules engine 121 aggregates and analyzes this presence information in view of preference rules/policies and if appropriate sets the in-a-conference presence state 116. Then, the presence server 120 publishes the in-a-conference presence state 116 so it can be received by the PBX 100. In this way, the PBX 100 knows that person 106 is likely to be participating in a multi-party conference call. Several different examples are described next to indicate how the presence server 120 and rules engine 121 can determine when to set the in-a-conference presence state 116.

In the first example, the presence server 120 interfaces with the conference/collaboration connector 122a and obtains presence information via the conference/collaboration bridge 114a which indicates a phone number of a calling party (or a called party) that called (or was called by) the external conference/collaboration bridge 114a to participate in a multi-party conference call. The rules engine 121 analyzes this information (in view of other information) and determines that the phone number of the calling party (or called party) is associated with the device 104 that is used by person 106. The rules engine 121 then infers that person 106 is participating in a multi-party conference call hosted by the external conference/collaboration bridge 114a and sets the in-a-conference presence state 116. The presence server 120 publishes the in-a-conference presence state 116. And, the PBX 100 after receiving the published in-a-conference presence state 116 disables the music-on-hold feature for person's device 104.

In the second example, the presence server 120 interfaces with the telephony connector 122b and obtains presence information via the PBX 100 which indicates that person 106 used device 104 to call a particular phone number or to receive a call from a particular phone number. The rules engine 121 analyzes this information (in view of other information) and determines that this particular phone number is associated with the external conference/collaboration bridge 114a. The rules engine 121 then infers that person 106 is participating in a multi-party conference/collaboration call hosted by the external conference/collaboration bridge 114a and sets the in-a-conference presence state 116. The presence server 120 publishes the in-a-conference presence state 116. And, the PBX 100 after receiving the published in-a-conference presence state 116 disables the music-on-hold feature for person's device 104.

In the third example, the presence server 120 interfaces with the calendar connector 122c and obtains presence information via the calendar server 114c which indicates that person 106 is scheduled at a particular time to participate in a multi-party conference call. The rules engine 121 analyzes this information (in view of other information) and sets the in-a-conference presence state 116 when the multi-party conference call is scheduled to take place. The presence server 120 publishes the in-a-conference presence state 116. And, the PBX 100 after receiving the published in-a-conference presence state 116 disables the music-on-hold feature for person's device 104.

In the fourth example, the presence server 120 interfaces with the IM connector 122d and obtains presence information via the IM server 114d which indicates that person 106 has manually set the in-a-conference presence state 116. The presence server 120 publishes the in-a-conference presence state 116. And, the PBX 100 after receiving the published in-a-conference presence state 116 disables the music-on-hold feature for person's device 104.

In the fifth example, the presence server 120 interfaces with the PC connector 122e and obtains presence information via the PC 114e which indicates that person 106 has used a GUI in their PC 114a to call a particular phone number. The rules engine 121 analyzes this information (in view of other information) and determines that this particular phone number is associated with the external conference/collaboration bridge 114a. The rules engine 121 then infers that person 106 is participating in a multi-party conference/collaboration call hosted by the external conference/collaboration bridge 114a and sets the in-a-conference presence state 116. The presence server 120 publishes the in-a-conference presence state 116. And, the PBX 100 after receiving the published in-a-conference presence state 116 disables the music-on-hold feature for person's device 104.

In the sixth example, the presence server 120 interfaces with the email connector 122f to obtain presence information via the email server 114f which indicates that person 106 has received and/or sent an email indicating that they are scheduled at a particular time to participate in a multi-party conference call. The rules engine 121 analyzes this information (in view of other information) and sets the in-a-conference presence state 116 when the multi-party conference call is scheduled to take place. The presence server 120 publishes the in-a-conference presence state 116. And, the PBX 100 after receiving the published in-a-conference presence state 116 disables the music-on-hold feature for person's device 104.

In the seventh example, the presence server 120 interfaces with the miscellaneous connector 122g and obtains presence information via a miscellaneous device 114g (e.g., PDA, mobile phone, PC). The presence information can indicate that person 106 has used a GUI, a keyboard, a keypad, a pointer, a mouse etc. . . . to manually set the in-a-conference presence state 116. The presence server 120 publishes the in-a-conference presence state 116. And, the PBX 100 after receiving the published in-a-conference presence state 116 disables the music-on-hold feature for person's device 104.

As can be seen, the presence server 120 can collect a wide variety of presence information about the real-time activities of person 106 and then the rules engine 121 can analyze that information and determine/infer that person 106 is likely participating in a multi-party conference call which is being hosted by the external conference/collaboration bridge 114a. Of course, it should be appreciated that the presence server 120 can also collect other types of presence information which were not mentioned above but could be used by the rules engine 121 to determine/infer that person 106 is likely participating in a multi-party conference call which is being hosted by the external conference/collaboration bridge 114a.

Figure 2:
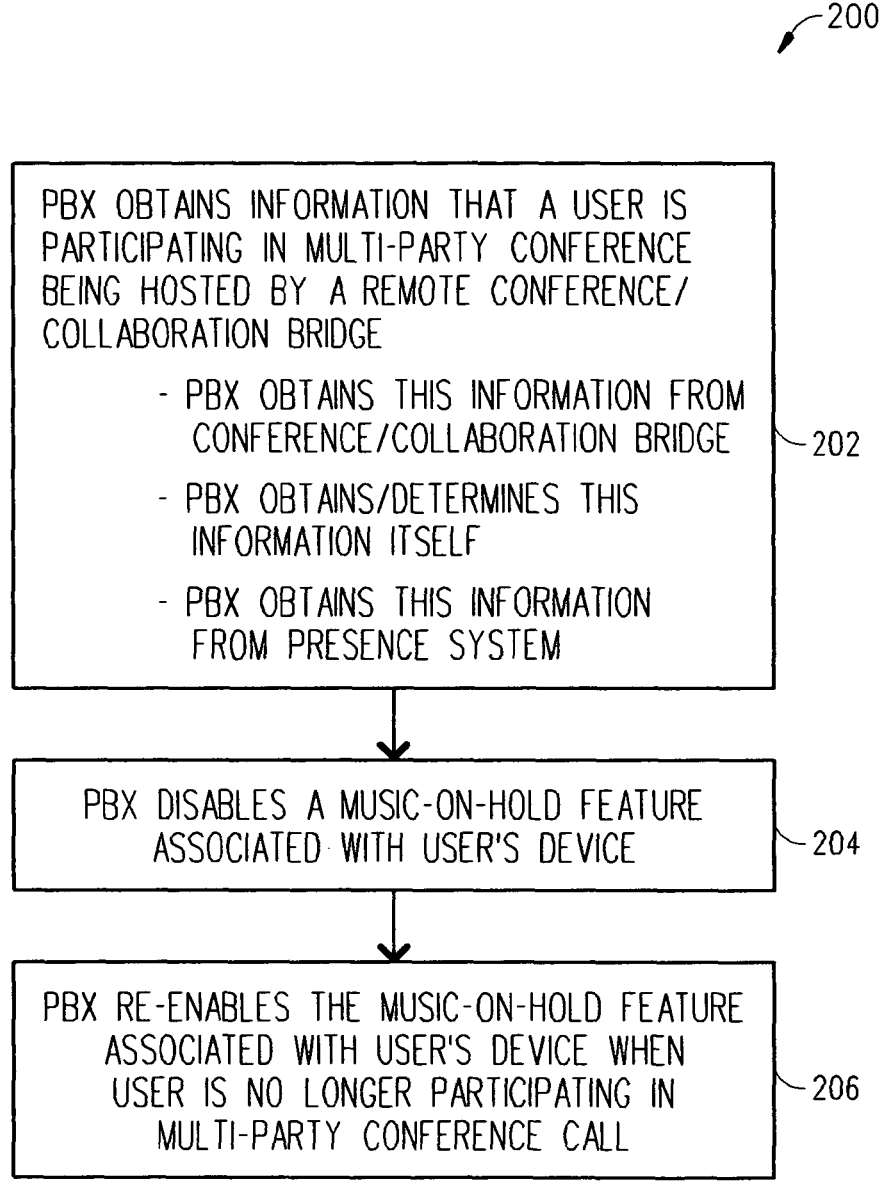
FIG. 2 is a flowchart that illustrates the basic steps of a method for enabling a PBX (or network hosted device) to automatically disable a music-on-hold feature for a particular user in accordance with the present invention.

Referring to FIG. 2, there is a flowchart of the basic steps of the method 200 for enabling the PBX 100 (or network hosted device 100) to automatically disable the music-on-hold feature for a user 106 when they happen to be participating in a multi-party conference call which is being hosted by an external conference/collaboration bridge 114a. Beginning at step 202, the PBX 100 (in particular the processor/music-on-hold suppression unit 114b) obtains information that person 106 is using a device 104 (e.g., office phone 104) connected to the PBX's extension 102 so they can participate in a multi-party conference/collaboration session being hosted by an external conference/collaboration bridge 114a. As discussed above, the PBX 100 can obtain this information directly from the conference/collaboration bridge 114a (see option #1). The PBX 100 can also determine by itself that person 106 is participating in a multi-party conference call being hosted by the conference/collaboration bridge 114a (see option #2). In addition, the PBX 100 can obtain this information (e.g., in-a-conference presence state 116) from the presence system 118 (see option #3). At step 204, the PBX 100 (in particular the processor/music-on-hold suppression unit 114b) after obtaining this information disables the music-on-hold feature for extension 102 which is associated with the device 104 that is being used by person 106. At this time, if person 106 places the device 104 on-hold then no sound will be injected into the multi-party conference call. At step 206, the PBX 100 (in particular the processor/music-on-hold suppression unit 114b) re-enables the music-on-hold feature for extension 102 which is associated with device 104 after a predetermined amount of time has passed or when it is determined that person 106 is no longer participating in the multi-party conference call.

Following are some additional features, advantages and uses of the present invention:
The PBX 100, the presence system 118 and the method 200 can support and monitor any number of people even though only one person 106 shown and described herein.

The presence system 118 can be configured to error on the side of safety when it is determining whether or not person 106 is participating in a multi-party conference call and set the in-a-conference presence state 116. Because, if the PBX 100 disables the music-on-hold feature and person 106 is not participating in a multi-party conference then there is little if any harm that can be done except that another person will not hear music when they are placed on hold.

The music-on-hold suppression unit 114b could be located external to the PBX 100. In this case, the music-on-hold suppression unit 114b would communicate via a computer-telephony interface (CTI) with the PBX 100. This scenario is not shown in FIG. 1.

The PBX 100 can obtain other types of presence information from the presence system 118 in addition to the in-a-conference presence state 116. However, the presence system 118 may have rules/policies that are used to decide which presence information should be sent to the PBX 100.

Even though person 106 is described herein as participating in a multi-party conference call. It should be understood that the present invention can also be used if person 106 happens to be participating in a collaboration session.

The present invention can be related and coupled with another invention discussed in the following documents:
U.S. patent application Ser. No. 11/233,987 filed on Sep. 23, 2005 and entitled "Telephony/Conference Activity Presence State".
U.S. patent application Ser. No. 11/302,860, filed on Dec. 13, 2005 and entitled "System and Methods for using Data about who is speaking in a Communications Conference to Enhance Business use of temporal Identification of Those Participating and of Communications Conference Archives".

The contents of these documents are hereby incorporated by reference herein.

An external conference solution provider (customer premises based or carrier based) could provide this conference presence service and PBX enhancement system as a value added service to their customers. For example, Alcatel's eDial product can be enhanced in accordance with the present invention and then be coupled with a vendor's PBXs via a GETS-like CTI connector.

For a more detailed discussion about the basics of the presence system 118, reference is made to the following documents:
Jack Jachner et al. "Rich Presence: A New User Communications Experience" Technology White Paper, 8 pages, copyrighted 1st quarter 2005.
J. Rosenberg, "A Data Model for presence", draft-ietf-simple-data-model-05 (work in progress), Sep. 22, 2005.
Rosenberg, J. "A presence Event package for the Session initiation protocol (SIP)", RFC 3856, August 2004.
H. Shulzerine et al. "RPID: Rich Presence Extensions to the presence Information Data Format (PIDF)", draft-ietf-simple-rpid-08, (work in progress), Jul. 16, 2005.
Rosenberg, J. "Presence Authorization Rules", draft-ietf-simple-presence-rules-03 (work in progress), Jul. 20, 2005.

The contents of these documents are incorporated by reference herein.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for enabling a device to automatically disable a music-on-hold feature, the method comprising:

collecting real-time presence information about a person's utilization of a communication unit from a plurality of different sources using a presence server, the plurality of different sources consisting of: an email source, a computer source, an Instant Messaging source, a calendar source and a mobile device source;

aggregating and analyzing the collected real-time presence information in view of preference rules and policies using a rules engine, the rules engine and presence server a part of a presence system;

setting a presence state as "in-a-multi-party conference call/collaboration session" for a person's communication unit based on a determination that the person is participating in a multi-party conference call/collaboration session using the rules engine;

publishing the "in-a-multi-party conference call/collaboration session" presence state by the presence server; and upon receiving the published "in-a-multi-party conference call/collaboration session" presence state information from the presence system, disabling the music-on-hold feature on the device's extension associated with the communication unit prior to placing the communication unit on-hold so that no sound will be injected into the multiparty conference/collaboration session when the communication unit is placed on hold.

2. The method of claim 1 further comprising interfacing the presence server with an Instant Message connector to obtain presence information indicating that the person has manually set the "in-a-multi-party conference call/collaboration session" presence state.

3. A presence system comprising:

a presence server for collecting real-time presence information about a person's utilization of a communication unit from a plurality of different communication sources, the plurality of different sources consisting of: an email source, a computer source, an Instant Messaging source, a calendar source and a mobile device source;

a rules engine for, aggregating and analyzing the collected real-time presence information in view of preference rules and policies;

setting a presence state as "in-a-multi-party conference call/collaboration session" for a person's communication unit based on a determination that the person is participating in a multi-party conference call/collaboration session; and said presence server for publishing the in-a-multi-party conference call/collaboration session presence state to a device to disable a music-on-hold feature on an extension attached to the communication unit associated with the user prior to placing the communication unit on-hold so that no music or other sound will be injected into the multi-party conference/collaboration session when the communication unit is placed on hold.

4. The presence system of claim 3, wherein: the presence server is configured to interface with an Instant Message connector to obtain the presence information indicating the person has manually set the "in-a-multi-party conference call/collaboration session" presence state.

* * * * *